July 20, 1971  G. F. WAKEFIELD  3,594,215
COATING OF GRANULAR PARTICLES
Filed Sept. 10, 1968
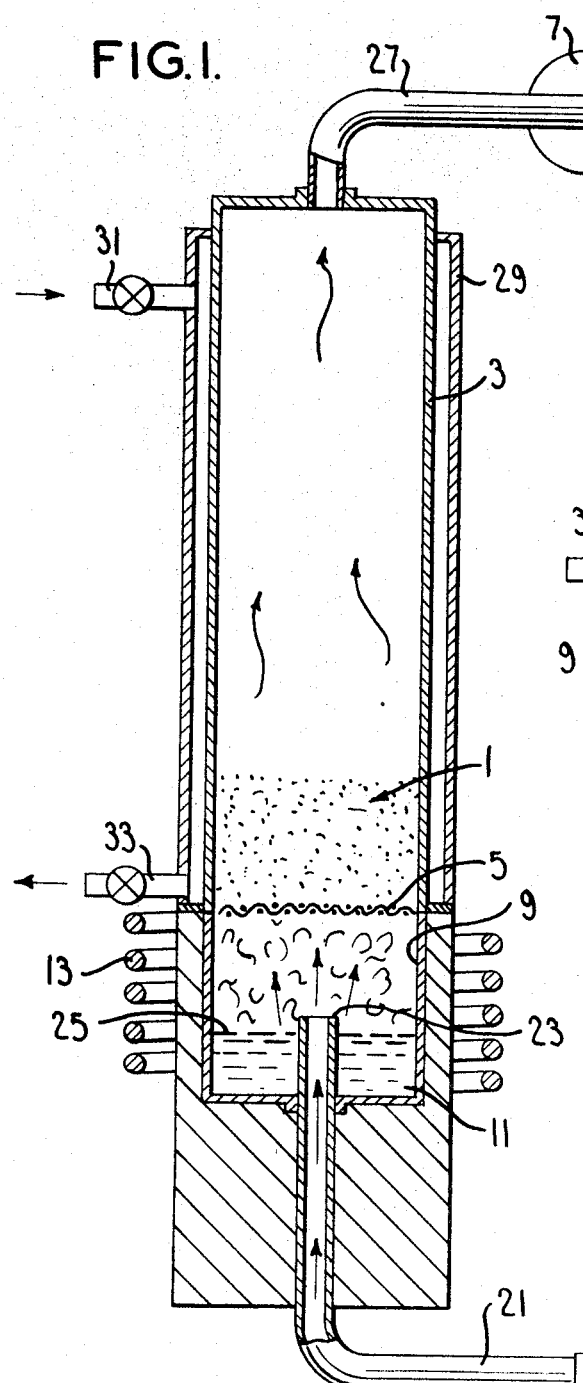
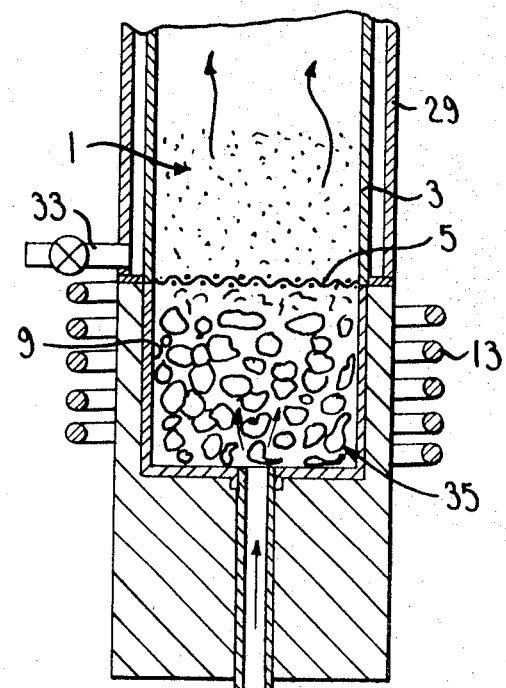
Gene F. Wakefield,
Inventor.

3,594,215
COATING OF GRANULAR PARTICLES
Gene F. Wakefield, Richardson, Tex., assignor to Texas Instruments Incorporated, Dallas, Tex.
Continuation-in-part of application Ser. No. 522,769, Jan. 24, 1966. This application Sept. 10, 1968, Ser. No. 758,795
Int. Cl. C23c 13/04
U.S. Cl. 117—100                                    6 Claims

ABSTRACT OF THE DISCLOSURE

Disclosed is a method and apparatus for coating particulate material with metals utilizing a fluidized bed. The invention comprises a jacketed fluidizing chamber evacuated by a vacuum pump and containing particles to be coated, a cell containing the coating metal, and heating coils for heating the metal. The process enables metallic coatings to be placed on heat sensitive substrate particles, since the fluidizing chamber is easily cooled by the combined effects of circulating a cooling fluid through the jacket and maintaining a vacuum in the chamber.

---

This application is a continuation-in-part of co-pending application Ser. No. 522,769, filed on Jan. 24, 1966, and now abandoned.

This invention relates to improved apparatus and methods for coating granular particles by a fluidizing process and to the resulting coated particles.

Among the several objects of the invention may be noted the provision of simple, low-cost means for coating granular particles; the provision of such means effective in general for various particles and coatings therefor and for coating certain granular particles with certain coatings not heretofore possible such as, for example, deposition of a high melting point metal on particles of limited thermal stability; the provision of fluidizing apparatus and methods for coating granular particles at low temperatures and pressures in a fluidizing chamber using low quantities of gas to provide the coating by condensation; and the provision of improved coated granular particles manufactured according to the processes of this invention. Other objects and features will be in part apparent and in part pointed out hereinafter.

The invention accordingly comprises the constructions, products, and methods hereinafter described, the scope of the invention being indicated in the following claims.

In the accompanying drawings, in which several of various possible embodiments of the invention are illustrated, FIG. 1 is a view partially in section illustrating one form of apparatus made according to the invention; and FIG. 2 is a section illustrating a modification.

Corresponding reference characters indicate corresponding parts throughout the several views of the drawings.

Vapor deposition of films of metal on particles can be accomplished by reduction or decomposition in a hot fluidized bed of a halide or other volatile compounds. This requires heating of the particles to the reaction temperature and also requires undesirably large quantities of gas for fluidizing. Moreover, a suitable halide or other vapor must be obtained and such is not always readily available.

Another method for depositing metal on particles employs reflected vapor evaporation in a vacuum of the metal or metals located in a rotating drum. This requires a reasonably good vacuum and tends unduly to heat the particles. High temperatures are required in this process to yield copious quantities of metal vapor since diffusion of vapor is relied upon. The required high temperature may cause evaporant-crucible interaction and are deleterious to particles to be coated which are of low thermal stability.

Briefly, referring to the drawings, granular particles 1 to be coated according to the invention are placed in a chamber 3. A screen, mesh, or other foraminous member 5 extends across the bottom of chamber 3 for supporting the particles. A stream of gas is introduced into chamber 3 through the foraminous member 5 and forced up through particles 1 to suspend the particles in the gas stream, thereby providing a fluidized bed of the particles. The term fluidized refers to the churning motion of the substrate particles in chamber 3 caused by the upward flow of gas therethrough. According to the invention, churning is maximized while gas flow is minimized. This is accomplished by means of a vacuum pump 7 which draws the gas out the top of chamber 3 and maintains the chamber at a low pressure. Beneath the screen 5 is a cell 9 which contains a metal or metal alloy 11. The cell is heated to vaporize a portion of the metal by an induction coil 13 positioned around the cell. The vaporized metal is entrained in the stream of gas delivered to the cell and passes from the relatively hot cell 9 through screen 5 into the cooler chamber 3 where it is deposited on the particles 1 by condensation of the hot metal vapor on the cooler particles 1. Chamber 3 and cell 9 are both closed except for the gas inlet and outlet so that the vacuum can be maintained in the chamber.

More particularly, gas is introduced into the cell 9 from a gas pump 17 connected by a conduit 19 to a source of a suitable gas, preferably an inert gas such as helium. Pump 17 delivers the gas at low pressure through a conduit 21 into the cell 9. In FIG. 1, the metal 11 in the cell is in the liquid form, and therefor the discharge end 23 of conduit 21 is preferably above the surface 25 of the metal.

The walls of cell 9 are preferably made of graphite or other suitable refractory material. The induction heater coil 13 maintains the cell walls at a temperature sufficiently high to maintain the metal in the cell in the liquid state and to vaporize a portion of the metal. The vaporized portion becomes entrained in the gas stream as it passes through cell 9. The temperature in cell 9 may be about 1200° C. when copper is being vaporized.

The foraminous member 5 may, for example, be a wire screen or it may be a plate having one or a multiplicity of holes through it. Any hole or holes in the screen are large enough to admit gas from cell 9 into chamber 3 but are small enough to retain the particles in the chamber.

The gas is drawn through the screen and particles by the vacuum pump 7 which has its suction or inlet side in communication with chamber 3 through a conduit 27. Thus the gas is drawn through the particles under a low suction pressure (less than atmospheric pressure) near the top of the chamber. The gas moving through the particles causes an efficient flowing, turbulent, or churning movement of the particles, thereby creating a freely moving fluidized bed of the particles. Movement of the particles is regulated (in part) by the operation of the vacuum pump 7 since operation of pump 7 is one of the factors controlling the velocity and volume of gas delivered to chamber 3. For example, the vacuum pump may hold the pressure in the upper portion of chamber 3 to approximately 10–50 microns, thus reducing the quantity of gas required to fluidize the particles to a given extent by approximately 10 to 100 times the quantity required if the chamber is not under such a substantial vacuum. It will be understood, however, that in the cases of some thermally stable substrate particles that little or no vacuum may be required.

Heating of the metal in cell 9 melts and vaporizes it and also yields a metal vapor pressure. Since the pressure chamber 3 is preferably low, the gas entering the bed 1 contains a relatively high partial pressure of metal vapor, thereby minimizing the time required for depositing a given amount of the metal on the particles. Also, because of the low pressure in chamber 3 and the higher partial pressure of the metal vapor, there results a lower operating temperature, thus reducing thermal problems connected with materials, such as encountered with other processes. The amount of power required is also reduced. The passage of the gas through the metal vapor generating temperature, thus reducing thermal problems upon vapor diffusion, such as required by certain prior processes. This is desirable since vapor diffusion requires high temperature (and high power requirements) to produce the necessary large volume of metal vapor.

The cycle time for depositing metal on the particles 1 can be minimized by maintaining the particles in chamber 3 as cool as possible, since this reduces the time required to condense vaporized metal on the particles. Movement under fluidization of the particles aids in cooling them. Moreover, because the pressure in chamber 3 is usually low (due to operation of vacuum pump 7) the quantity of heat carried into the fluidized bed of particles by the helium gas and vaporized metal is relatively low. Additional cooling of the particles is preferably accomplished by positioning a water jacket 29 around the chamber 3 between the foraminous member 5 and the top of the chamber. Water or other cooling fluid is circulated through the jacket from a valved fluid inlet 31 to a valved fluid outlet 33. The fluid circulated through the water jacket extracts and carries off heat from the chamber walls. Control over the nature of the deposit is accomplished by controlling the rate of deposition, the particle temperature, and the surface characteristics of the particles.

Thus, it is apparent that the coating temperature in chamber 3 can be easily controlled by a combined adjustment of the pressure in chamber 3 along with the flow rate and temperature of the cooling fluid introduced into water jacket 29. By circulating a coolant such as liquid nitrogen in jacket 29 and adjusting vacuum pump 7 to produce a pressure of about 10-15 microns in chamber 3, heat sensitive particles can be coated at temperatures at, and even below, room temperature. It should be noted that use of a low temperature coolant, such as liquid nitrogen, in water jacket 29 will not, in the absence of a reduced pressure in chamber 3, effect as low a coating temperature as can be realized by combined utilization of such a coolant and reduced pressure coating environment. Since the coolant removes heat only from the walls of chamber 3, utilization of this method of temperatures control alone results in coating temperatures which are substantially above those which can be realized when vacuum pump 7 is used to reduce the pressure in chamber 3 and fluidize the particle bed. As heretofore pointed out, this reduced chamber pressure causes a fluid flow of gas over and around the particles which cools them. Further, the quantity of heat carried into chamber 3 from cell 9, which contains heated metal, is greatly lowered due to the reduced pressure in chamber 3. The heat reduction effect from this reduced pressure technique combined with use of a suitable coolant flowing through water jacket 29, allows metallized coating of heat sensitive substrates (such as plastics) at temperatures below room temperature. Of course, since most plastics are thermally stable at room temperature (about 25° C.) up to about 80° C., this temperature range is preferred for coating this and other types of heat sensitive substrates. It will be recognized that substantially any desired coating temperature can be effected in chamber 3 by proper regulation of pressure therein and proper choice of coolants.

A modification of the invention to achieve additional economy of the gas used for fluidizing is provided by recirculation. To this end, the outlet of the vacuum pump 7 is connected to the inlet conduit 19 to effect a recirculation of the gas. Thus utilization of slow deposition rates or formation of thicker coatings is accomplished without a proportionate increase in gas consumption.

FIG. 2 of the drawings shows a modification in which the metal supply in cell 9 is in the form of solid metal particles, chips, shavings, chunks, or the like, designated 35, which substantially fill cell 9. Since solid pieces are used, the gas inlet pipe 21 can, in this case, terminate at the bottom of cell 9. In other respects the FIG. 2 apparatus is the same as the FIG. 1 apparatus previously described and may be operated in the same manner. Like numerals designate like parts. In this case, for example, iron or nickel chunks may be employed with the gas at approximately 1200° C. These chunks do not melt but sublime to the vapor form.

The apparatus and method of this invention have been used to deposit a conductive copper film upon particles of silica sand. The coated particles were then cemented together to form a low-value resistor. Using the method of this invention, resistors of various thermal coefficient values are possible by fabrication of the resistors from particles coated with an alloy of the desired thermal coefficient or by mixtures of coated particles having higher and lower thermal coefficients. This method and apparatus also are usable in deposition of elements, alloys (from single or multiple sources), or compounds of materials into various particles or substrates. Reactions for the formation of a coating gas such as aluminum monochloride in chamber 9 can also be used as a source of coating material. In this example, the reaction may be expressed:

$$AlCl_3 \text{ (gas)} + 2Al \text{ (liquid)} \rightarrow 3AlCl \text{ (gas)}$$
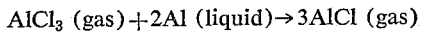

The AlCl decomposes on the cooler particles and deposits aluminum according to the reaction:

$$3AlCl \text{ (gas)} \rightarrow 2Al \text{ (solid)} + AlCl_3 \text{ (gas)}$$
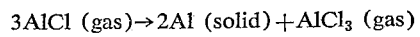

The invention is particularly suitable for coating thermally limited particles which might melt in the presence of the hot vaporized coating material as heretofore described.

In addition to the manufacture of resistors as previously mentioned, the process and apparatus may be used for manufacture of other products. For example, a noble or catalytic metal can be deposited upon an inert substance to provide a larger and thus more efficient reaction surface. Also, inexpensive or inert coated particles can be formed for use in forming controlled porosity bodies for filtering. Dispersion hardened materials can be formed by coating of oxide, carbide, or other refractory material with a metal (or by coating a metal with an oxide or carbide) and by subsequent compaction of the coated particles. In a similar manner, ultrahard cemented materials can be formed. The process also can be used for manufacturing multiphase materials which would have a high damping characteristic.

Other uses for the process of the invention include the manufacture of coated particles of materials of a reactive nature which, at a subsequent time, are caused to react. For example, nickel particles can be coated with aluminum which, when plasma sprayed, will yield a nickel-aluminide coating. Also, zirconium can be coated with aluminum and formed into ribbons for use in flashbulbs. The process and apparatus can also be used for coating a magnetic material on a nonmagnetic particle and forming them into bodies of a uniform, magnetically nondense volume.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:
1. A method of coating granular heat sensitive particles comprising placing the particles to be coated in a chamber having a cooling means attached thereto, through which cooling means a cooling fluid is circulated, passing stream of gas up through and out of the chamber around the particles to reduce the fluid pressure in the chamber and to fluidize and cool the particles therein, vaporizing a high melting point metal, entraining the vaporized metal in the gas stream to place the coating material in contact with the substantially cool, and moving particles whereby the coating material is deposited on the particles at a temperature determined by selection and regulation of the fluid circulated in the cooling means and regulation of the fluid pressure in the chamber.
2. A method according to claim 1, wherein the coating material is in liquid form and is vaporized by heating the coating material.
3. A method according to claim 1, wherein the coating material is in the solid state and is vaporized by heating the coating material.
4. A method of coating granular heat sensitive particles comprising placing the particles to be coated in an annular, jacketed chamber, through which jacket cooling fluid is circulated, heating a coating metal in a cell to produce a vapor of the metal, directing a stream of gas through the cell to entrain the vaporized metal in the gas stream, passing the gas stream and metal vapor through the chamber and around the particles to be coated, thereby fluidizing and cooling the particles in the chamber, and removing the gas from the chamber to maintain a low pressure in the chamber, whereby the metal vapor is condensed on the particles at a temperature determined by selection and regulation of the cooling fluid through the jacket and regulation of the pressure in the chamber.
5. A method according to claim 4, wherein gas is removed from and supplied to the chamber under conditions which maintain pressure in the chamber at substantially less than atmospheric pressure, and the gas delivered to the chamber contains a high partial pressure of vaporized metal.
6. A method according to claim 5, wherein the gas removed from the chamber is recirculated to become said stream of gas directed through the cell.

References Cited

UNITED STATES PATENTS

| | | | |
|---|---|---|---|
| 1,710,747 | 4/1929 | Smith | 118—48X |
| 2,413,606 | 12/1946 | Colbert et al. | 117—107 |
| 2,612,442 | 9/1952 | Goetzel | 117—71X |
| 2,702,523 | 2/1955 | Prestwood et al. | 118—48 |
| 3,001,228 | 9/1961 | Nack | 117—100X |
| 3,012,876 | 12/1961 | Eaton et al. | 117—100X |
| 3,036,338 | 5/1962 | Nack | 117—100X |
| 3,077,385 | 2/1963 | Robb | 117—100X |
| 3,099,579 | 7/1963 | Spitzer | 118—48 |
| 3,108,022 | 10/1963 | Church | 117—100X |
| 3,202,537 | 8/1965 | Norman et al. | 117—100X |
| 3,249,509 | 5/1966 | Blocher | 117—100X |
| 3,307,964 | 3/1967 | Jacobson | 117—100X |
| 3,331,671 | 7/1967 | Goodwin | 118—48 |
| 3,338,744 | 8/1967 | Clough et al. | 117—107 |
| 3,390,026 | 6/1968 | Cerych et al. | 117—100 |

WILLIAM D. MARTIN, Primary Examiner

M. R. P. PERRONE, Jr., Assistant Examiner

U.S. Cl. X.R.

117—107.1, 107.2; 118—48